(12) United States Patent
Courchesne

(10) Patent No.: US 11,087,335 B2
(45) Date of Patent: *Aug. 10, 2021

(54) METHOD FOR WEB-BASED DISTRIBUTION OF TARGETED ADVERTISING MESSAGES

(71) Applicant: Hugues Courchesne, Drummondville (CA)

(72) Inventor: Hugues Courchesne, Drummondville (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/579,185

(22) Filed: Sep. 23, 2019

(65) Prior Publication Data

US 2020/0019973 A1   Jan. 16, 2020

Related U.S. Application Data

(63) Continuation of application No. 10/981,478, filed on Nov. 5, 2004, now Pat. No. 10,497,008.

(51) Int. Cl.
 *G06Q 30/02* (2012.01)

(52) U.S. Cl.
 CPC ......... *G06Q 30/02* (2013.01); *G06Q 30/0215* (2013.01); *G06Q 30/0224* (2013.01); *G06Q 30/0255* (2013.01); *G06Q 30/0258* (2013.01); *G06Q 30/0269* (2013.01)

(58) Field of Classification Search
 CPC ............... G06Q 30/02; G06Q 30/0224; G06Q 30/0255; G06Q 30/0269; G06Q 30/0215; G06Q 30/0258
 See application file for complete search history.

(56) References Cited

U.S. PATENT DOCUMENTS

| | | | | |
|---|---|---|---|---|
| 5,794,210 | A * | 8/1998 | Goldhaber | G06Q 30/0207 705/14.69 |
| 5,949,419 | A * | 9/1999 | Domine | G06F 16/95 715/744 |
| 6,009,410 | A * | 12/1999 | LeMole | G06Q 30/02 705/14.54 |
| 8,527,337 | B1 * | 9/2013 | Lim | G06F 16/903 705/14.35 |

(Continued)

*Primary Examiner* — Breffni Baggot

(57) ABSTRACT

A method for web browser-based distribution of targeted advertising messages is provided. An advertising party registers with a distributor of targeted advertising messages. An advertising campaign for goods targeting user demographic categories chosen by the advertising party is created, with advertising messages being customized for each category and the advertising messages being stored on a web server of the distributor. The advertising party pays the distributor for the advertising campaign. A user registers with the distributor for receiving advertising messages through a web browser and the user providing user demographic data and value account information at registration. The web browser home page of the user is configured with a user-specific URL corresponding to a set of targeted advertising messages according to the user demographic data. The user opens the browser and views the home page containing a target advertising message of the set of targeted advertising messages according to the user demographic category and the distributor credits the user value account upon the user viewing the advertising message.

6 Claims, 5 Drawing Sheets

(56) References Cited

U.S. PATENT DOCUMENTS

| | | | |
|---|---|---|---|
| 2004/0030598 A1* | 2/2004 | Boal | G06Q 30/0235 705/14.25 |
| 2005/0188314 A1* | 8/2005 | Matthews | G06F 3/0481 715/741 |
| 2006/0015405 A1* | 1/2006 | Bala | G06Q 30/02 705/14.66 |
| 2006/0068917 A1* | 3/2006 | Snoddy | A63F 13/06 463/42 |

* cited by examiner

METHOD FOR WEB-BASED DISTRIBUTION OF TARGETED ADVERTISING MESSAGES

FIELD OF THE INVENTION

The invention relates to distribution of targeted advertising messages. More specifically, it relates to a method allowing the distribution of customized advertising messages through a web-browser.

BACKGROUND OF THE INVENTION

Today's marketing communications landscape is changing as mass markets are fragmenting. Companies are developing more focused marketing programs in order to build stronger relationships with customers, as improvements in technology are helping marketers keep track of consumer needs. Since mass-marketing advertising methods are often inefficient due to a low level of customization, a new type of marketing, known as direct marketing is emerging as the most efficient way of building brand awareness and preference.

The Internet is increasingly used as an effective customer communication and relationship enhancer. Advertisers want to reach a large number of customers at the lowest cost/customer. An inexpensive means for delivering advertising content is through the use of banner advertising. Unfortunately, Internet mass-marketing efforts have been shown to have a relatively low impact since Internet users are becoming more experienced and developing what is known as "banner blindness".

Another Internet mass-marketing means is the use of bulk email. Unfortunately, traditional bulk email advertising is not directed to specific target markets. Additionally, customers have come to perceive receiving unsolicited email messages as intrusive and bothersome. With bulk email, the customers may access their email accounts on daily or weekly basis which reduces the advertising exposure time. The results of bulk email are that either the customer simply ignores the message or develops a negative opinion about the sender.

Studies show that marketing efforts are efficient when the customer has an interest in the product/service being marketed.

There exists therefore a need for a method of delivering advertising messages that offers repeated exposure, at a low cost/customer and provides customer value.

SUMMARY OF THE INVENTION

Accordingly, an object of the present invention is to provide a web-based distribution system and method for delivering targeted advertising messages.

According to a first broad aspect of the present invention, there is provided a method for web browser-based distribution of targeted advertising messages, comprising: an advertising party registering with a distributor of targeted advertising messages; creating an advertising campaign for goods targeting user demographic categories chosen by the advertising party, with advertising messages being customized for each the category, the advertising messages being stored on a web server of the distributor; the advertising party paying the distributor for the advertising campaign; a user registering with the distributor for receiving advertising messages through a web browser; the user providing user demographic data and value account information at registration; configuring the web browser home page with a user-specific URL corresponding to a set of targeted advertising messages according to the user demographic data of the user; the user opening the browser and viewing the home page containing a target advertising message of the set of targeted advertising messages according to the user demographic category; and the distributor crediting the value account upon viewing the advertising message.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

Figure 1:
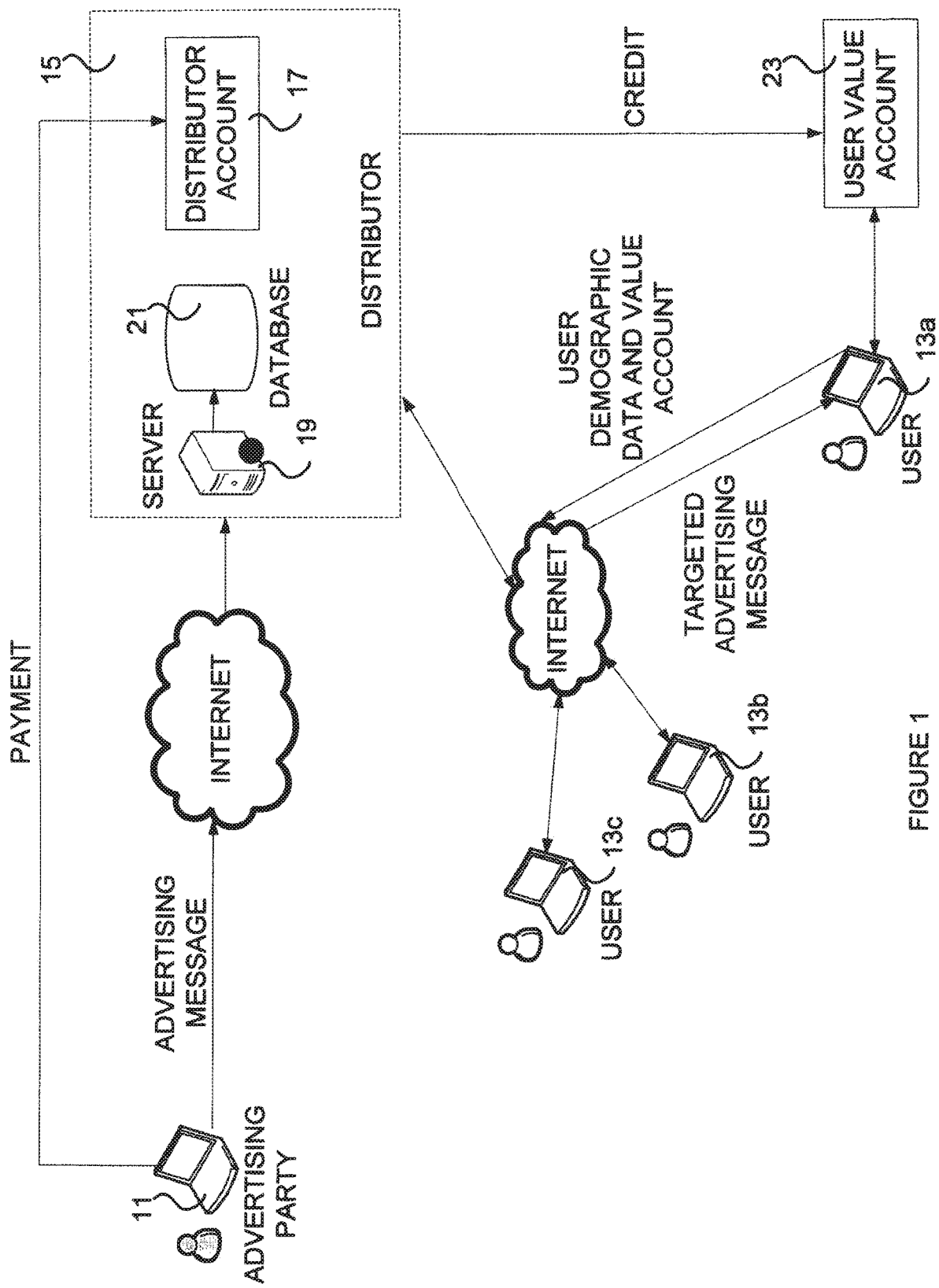
FIG. 1 is a block diagram of a web-browser based system for distribution of targeted advertising messages according to the preferred embodiment of the present invention.
Figure 4:
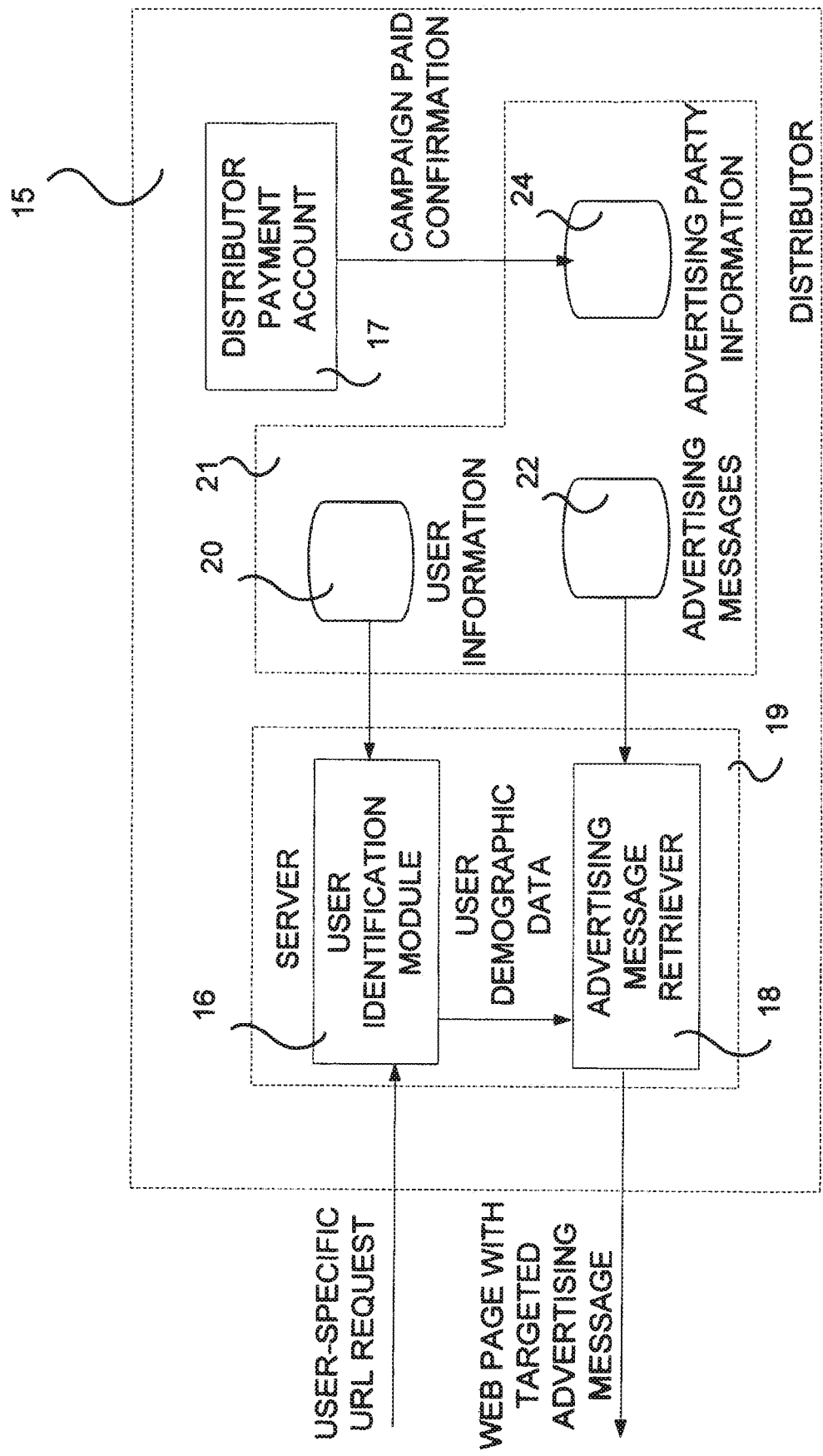
FIG. 4 is a block diagram of a distributor according to a preferred embodiment of the present invention.

Referring now to FIG. 1 and FIG. 4, there is shown a block diagram of a system for web browser-based distribution of targeted advertising messages. The system includes an advertising party 11 which creates and manages an advertising campaign for a product or a service. The advertising party 11 could be an advertising agency or a marketing department of a company. The advertising party 11 is responsible for creating an advertising message that will be distributed to the users of the targeted advertising system by means of the distributor 15. The advertising message contains information about a product, possibly including a promotional offer related to the product, such as a discount, a premium, an advertising specialty item gift, a patronage reward, a product sample, etc. or any other purchase incentive known in the art. The advertising message is preferably created by the advertising party 11 and the distributor 15, using customer demographic information stored by the distributor, for tailoring the advertising message to a target audience. The advertising party 11 selects the most appropriate target customers according to customer demographic data, develops an advertising message accordingly and the distributor stores it on the advertising messages database 22. Each advertising message can be accessed by an appropriate URL link. The distributor 15 stores additional information regarding the advertising campaign including: start date, end date, purchase confirmation, prizes awarded in conjunction with a search on the distributor search engine, etc. on the advertising party info database 24.

The advertising party 11 and the distributor 15 communicate with each other through a public network, such as the Internet. In this embodiment, for exemplary purposes, only one advertising party 11 is shown, although advertising parties 11 could communicate with a distributor 15 as part of the same system. The advertising party 11 communicates via any suitable transmission media, such as an ordinary public telephone line, a data quality line, a radio link or any other transmission media suitable for inter-computer communication.

The distributor 15 includes a server 19 and a database 21, as well as a distributor account 17. The server 19 receives advertising messages content from advertising party 11 or requests for user-specific web pages from user stations 13 and ensures security of the transactions by implementing various security protocols.

Referring to FIG. 4, the server 19 uses the information stored on the user account information database 20, which includes account details for all of its registered users. The user account details may include user account ID, password, value account information, and demographic information such as age, gender, location, occupation, education, etc. The database 21 also comprises an advertising messages database 22 storing advertising messages of advertising campaigns and associated with advertising parties 11. The advertising party account information database 24 stores identification information and campaign details of advertising parties 11 with which the distributor has established contracts for distribution of advertising campaigns to registered users 13. The advertising party account information database 24 preferably includes information regarding the status of outstanding invoices for the distribution services. The distributor 15 further comprises a distributor payment account 17 for receiving payment from advertising parties for advertising campaign development and distribution services. Whenever the distributor payment account is credited by an advertising party 11 paying for an invoice, the database 24 receives a payment confirmation and the corresponding advertising party account is updated.

The server comprises a user identification module 16 which is in communication with the user account information database 20 for identifying a user given a URL request and retrieving the corresponding user demographic data. The user identification module 16 provides user demographic data to the advertising message retriever 18, which uses it to retrieve an appropriate advertising message from the advertising messages database 22.

In one embodiment of the present invention, the database 21 resides directly on the server 19. In the preferred embodiment of the present invention, the server 19 is a secure server protected by firewall and encryption technologies in order to ensure security of the information stored in the database 21. The distributor 15 uses a website as an interface to provide access to users 13 and advertising parties 11 to register with the advertising distribution system.

User 13 can be a member of an organization, a company, an educational institution such as a high school or university, or an individual user which registers with the distributor 15 for receiving targeted advertising messages and a credit value.

In a preferred embodiment, the user station 13 is a computer platform running, for example, a web-based application, and is in connection with a distributor 15. An exemplary computer system used at a user station 13 may comprise: a computer, an input system including a keyboard and a mouse, a display device, a digital camera, a document scanning device, a communication control device for communication with the network and possibly an external storage device. The computer includes a central processor unit (CPU), a read only memory (ROM), a random access memory (RAM) and an internal storage device. The software running at the user station 13 may reside on an external storage device or an internal one.

With respect to FIG. 2, a method for web browser-based distribution of targeted advertising messages will now be described. In a first step 31, an advertising party 11 registers with the distributor 15 of targeted advertising messages for the creation of an advertising campaign regarding a product or a service. The distributor 15 provides the advertising party 11 with user demographic categories and information so that a customized advertising campaign may be created, as per step 33. Users can be classified into demographic categories according to different demographic criteria, such as age, gender, geographical location, marital status, occupation, education, etc. A given demographic category can be very broad, such as all male students, or can be more focused, such as all male students between the ages of 18 and 24, living in urban areas, majoring in Engineering degrees. The distributor 15 preferably provides user purchasing habits statistical information regarding a particular user demographic category to better customize the advertising party's campaign. In a next step 35, the customized advertising message of the advertising campaign is stored on the advertising message database 22 of the distributor 15. The advertising message database stores a plurality of advertising messages corresponding to advertising campaigns contracted by advertising parties 11. The advertising messages are directly related to registered user profiles provided by the distributor 15.

The advertising party 11 then pays the distributor 15 for the advertising campaign and any other distribution fees, as per step 35. In the case in which the advertising party 11 is an advertising agency, the payment to the distributor could be a percentage of the total advertising fees charged to the client, typically 15%.

In a next step 39, a user 13 registers with the distributor 15 for receiving targeted advertising messages. In the preferred embodiment of the present invention, the user 13 registers with the distributor 15 by accessing the distributor website. A user at a user station 13 may register by using any commercially available Internet web browser, such as Microsoft Internet Explorer™ or Netscape Navigator™. Any terminal with web-browsing abilities, such as a personal computer, a web-enhanced cellular phone or a personal digital assistant may be used. Upon requesting the Uniform Resource Locator (URL) address corresponding to the distributor website, a web page is loaded in the user's browser, requesting the user's identification credentials (typically a username and password). Access to the distributor website contents can be controlled using a variety of security mechanisms, including 128-bit SSL encryption. If the user is not yet registered with the distributor 15, a registration page will request that the user provide information such as username, password, value account details and demographic information, such as age, gender, location, marital status, interests, etc. Upon providing the required information, a user account is created and stored on the user account 20 database. At the time of registration, the user 13 is associated with an account ID. The user station receives a user-specific URL which includes the account ID. The user-specific URL is used to configure the web page launch settings of the web browser 51. In the preferred embodiment of the present invention, the web browser's home page is configured with the user-specific URL, such that, upon launching the web browser, a user-specific URL request is made.

Figure 3:
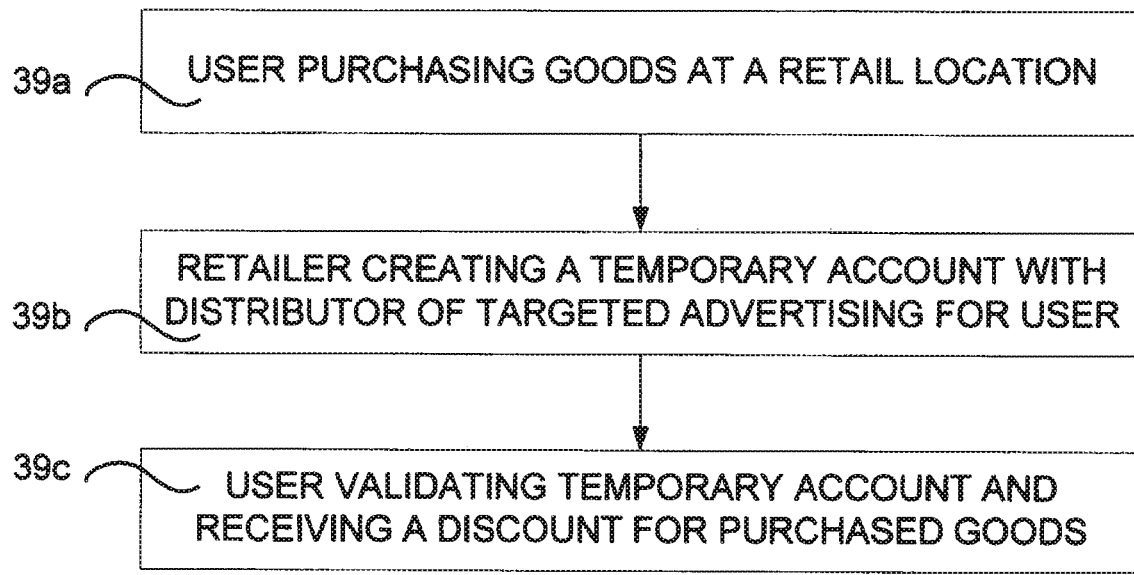
FIG. 3 is a flow chart of a method for a user registering with a distributor for receiving advertising messages according to one embodiment of the present invention.

In an alternative embodiment of the present invention, a customer could register while purchasing goods at a retail location. With respect to FIG. 3, in a first step 39a, the customer purchases products or services at a retail location and is informed by the retailer that a promotional offer or discount is available for the purchased goods. The retailer then verifies whether the customer is a registered user 13 of the advertising distribution network of the distributor 15. If the customer is already a user 13, then the retailer connects to the distributor website and provides the user's credentials such that the user's value account may be credited according to the promotional offer or discount. The user's value account 23 may be a payment account, in which case the payment account is credited with a sum corresponding to the discount. The payment account could be identified by a credit card account number, a debit bank account number and associated code or a Paypal-type account. Alternatively, the user's value account 23 could be a points-based reward account, in which case the value account 23 would be credited with a bonus number of points corresponding to the purchase.

If however the customer is not a registered user 13, the retailer connects to the distributor website in order to create a user temporary account as per step 39b. Following the purchase, the customer then connects to the distributor website in order to validate the temporary account. When customer validates the temporary account as per step 39c, the value account associated with the user account is credited for the amount of the promotional offer or discount.

After registering with the distributor 15, the user provides user demographic data and value account information as per step 41. Next, in step 43, the user web browser home page is configured with a user-specific URL. In the preferred embodiment of the present invention, the user station 13 comprises a web browser 51 and a user-specific web page launch configuration module 53. The launch configuration module 53 receives, upon registration with the distributor 15, a user-specific URL corresponding to a user-specific web page to be launched at the user station 13. The launch configuration module is in communication with the web browser and can adjust the browser home page settings to point to the user-specific URL, such that, upon launching the web browser, the user is directed to a user-specific web page. The user-specific web page contains the advertising message. The user specific web page could the user's home page or a web page opening in another window at the time that the web browser is launched.

Figure 5:
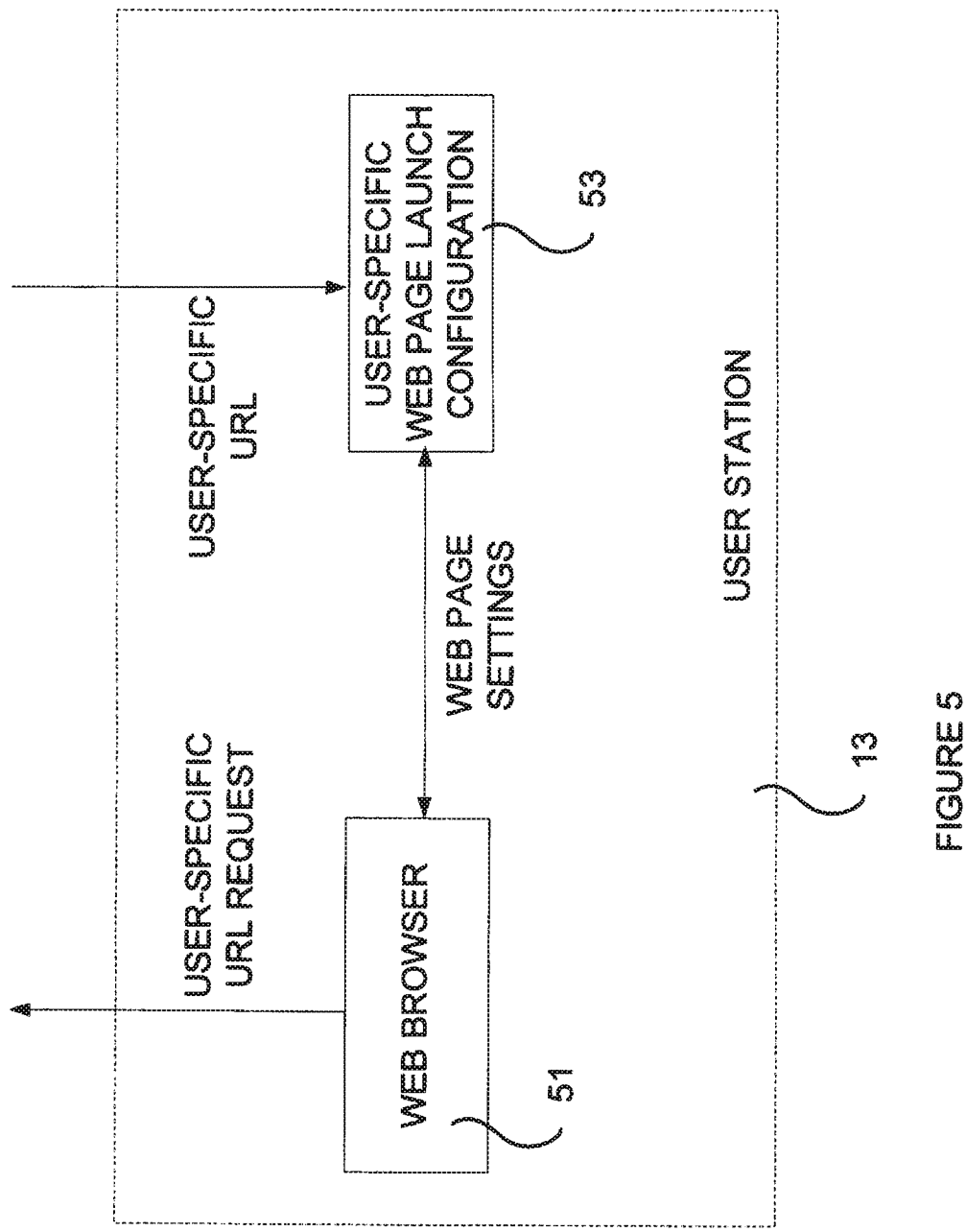
FIG. 5 is a block diagram of a user station according to a preferred embodiment of the present invention.

With respect to FIGS. 4 and 5, the interaction between the user's browser and the distributor server 19 will now be described. When the user launches the web browser 51, the application sends a request for a user-specific URL. The server 19 receives the URL request and retrieves the account ID contained in the URL request. The user identification module 16 of the server 19 then uses the account ID to retrieve user demographic data for the particular user. The user demographic data is sent to the advertising message retriever 18 module of the server 19, which accesses the advertising messages database 22 and retrieves an advertising message customized for the particular user profile. The server 19 then provides a web page containing the targeted advertising message to the user's web browser. In the case in which no advertising message stored on the advertising messages database 22 corresponds to the user profile, a default webpage, such as a distributor search engine website, is transmitted to the user 13.

Figure 2:
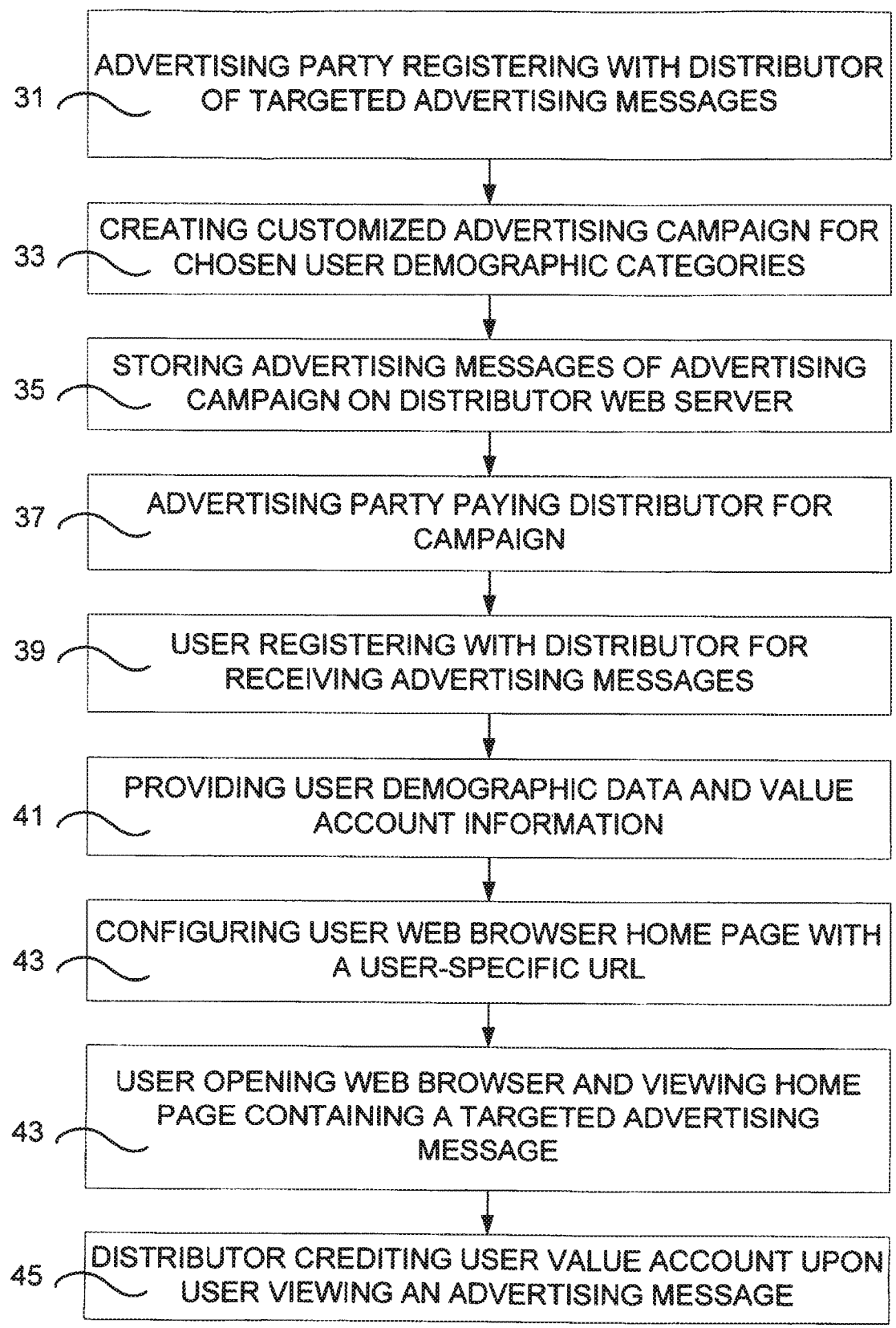
FIG. 2 is a flow chart of a method for web browser-based distribution of targeted advertising messages according to the preferred embodiment of the present invention.

Still with respect to FIG. 2, in step 43, the user 13 opens the web browser and views a web page containing a targeted advertising message. The advertising message displayed in the user's web browser corresponds to the user demographic data stored in the user account database 20. Upon the user viewing the advertising message, the distributor 15 credits the user value account 23.

In the preferred embodiment of the present invention, the user value account 23 is a payment account such as a Paypal account. A payment amount is transferred to the payment account of the user 13 each time an advertising message is viewed in the web browser 51. In the case in which the user is a individual user, the payment account is a personal account, while in the case in which the user belongs to an institution, such as an university, the payment account is an institutional account.

In another embodiment of the present invention, the users 13 of the targeted advertising distributor system 15 have the possibility of winning prizes following a web search using the distributor's web search engine. By connecting to the distributor website, a user 13 provides a search query by entering a description of a desired product or service in a search box of the distributor web search page. The search engine then provides the search results together with a prize, attributed on a random basis. In an alternative embodiment of the present invention, the search engine matches the product/services description provided as part of the search query with the products/services advertised by registered advertising parties 11 and randomly provides a prize to the user 13. The prize could include the goods searched or goods from other categories.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method of web-browser based distribution of one or more advertising messages to a user station which user station is an electronic device including but not limited to a personal computer, a cellphone, personal digital assistant, said electronic device including a CPU (Central Processing Unit), said web browser has a home page, said method comprising the steps:

providing a distributor of said advertising message, the distributor having
  a web server, responsive to a user-specific URL request from a user or advertising message from an advertising party, the web server ensuring security by implementing one or more security protocols, the web server providing a web page with the advertising message,
  protecting the web server with a firewall and encryption technologies in order to ensure security of the information stored in a distributor database, the web server having
    a user identification module which communicates with a user account database for identifying the user making a URL request and for retrieving demographic data corresponding to the user and providing the user demographic data and an advertising message retriever responsive to the provided user demographic data for providing an advertising message to the web browser of the user station;

the distributor having a distributor account, the distributor having the distributor database which distributor database includes a) the user account database storing i) user account ID, ii) password, iii) value account information iv), demographic information such as age, gender, location, occupation, education, and v) purchasing habits statistical information related to user demographic category, for providing information stored in the user account database to the advertising party for the advertising party to customize an advertising campaign and the advertising message to user;

b) an advertising message database storing the advertising message of the advertising campaign associated with the advertising party, the advertising message provided by the distributor relating directly to a profile of the user once user has registered, and the advertising message created by the advertising party being based on user demographic category obtained from distributor, and the advertising message contains at least one of information about a product, a promotional offer related to the product, a discount, a premium, gift, a patronage reward, a product sample, purchase incentive;

c) an advertising party database that stores identification information and campaign details of the advertising party with which the distributor has a contract for distribution of the advertising message as part of the advertising campaign;

providing, by the distributor, a website as an interface which provides access to the user and the advertising party;

each of the user and advertising party registering with the distributor via the interface;

providing, by the distributor, demographic categories and information to the advertising party so that the customized advertising campaign can be created by the advertising party, based on demographic criteria including at least one of age, gender, geographical location, marital status, occupation, education, age range, area of study in college;

providing to the advertising party, by the distributor, the user registered profile with which the advertising party can create the advertising message of the customized advertising campaign directly related to the user profile;

receiving, by the distributor, the advertising message from the advertising party or the request for the user-specific web page from the user station, the distributor ensuring security of these two by one or more security protocols;

the advertising party registering, by the web site interface of the distributor, and the advertising party communicating via radio-link with the distributor of the advertising message;

the advertising party sending a payment to the distributor for the advertising campaign and any other distribution fees;

paying, when the advertising party is an advertising agency, the distributor where the payment is based on a percentage of total advertising fees;

accessing the distributor website, by advertising party or user, using 128-bit SSL (Secure Sockets Layer) encryption;

the advertising party, after registering with the distributor, creating the advertising campaign, including the advertising message, for goods targeting one or more user demographic categories chosen by the advertising party, with the advertising message customized to each demographic category, the message created by the advertising party and distributor with user demographic information stored by the distributor for tailoring the advertising message by demographic category, and storing the advertising messages on the web server of the distributor;

storing in the distributor database the user demographic categories include at least one of age, gender, geographical location, marital status, occupation, education, an age range, an area of study or occupation, living in urban setting;

the advertising party selecting the most appropriate target users according to user demographic to develop the advertising message accordingly, and the distributor stores it on the advertising messages database;

each advertising message can be accessed and displayed at a homepage URL;

creating a plurality of user profile categories for said advertising message;

storing said user profile categories in said distributor database;

the user registering with the distributor, through the distributor web site interface, for receiving at the web browser of the user station the advertising message from and stored in the advertising message database, the user registering producing a user registration which includes each of i) account ID or username, ii) password, iii) value account detail, iv) and demographic information and one or more of age, gender, location, marital status, personal interest, hobby, occupation, education, age range;

the user, at the time of registration, providing demographic and value account information to distributor;

receiving, from said user profile, the value account related to said user profile at said user registration and data related to said user profile, that data including at least one user account ID, password, information related to said value account, and demographic information and one or more of age, gender, location, occupation, education;

upon user station requesting a URL corresponding to the distributor website, loading a web page in the user's browser, which web page requests user's username or account ID and password;

receiving, at the time of user registration, at the user station a user-specific URL which includes the account ID;

the user station, at the time of user registration, receiving the user-specific URL which includes the account ID and configuring web page launch settings of the user station web browser with the user-specific URL such that upon launching the web browser, request is made to the distributor to reply with the user-specific URL;

said CPU, upon said web browser connecting to said distributor web server, providing a home page for said web browser;

the user identification module at said web server communicating with said distributor database and identifying said user and providing to said browser the home page including said account ID and advertising message according to said user profile, wherein said home page includes the account ID;

said web browser launch configuration module communicating with said browser for a first launch of the application under the control of said CPU;

said web browser configuring the launch settings of the home page of said application to said user-specific URL;

upon a second subsequent launch of said application, said browser launching to said user-specific URL, wherein said configured launch setting of said browser persists after said browser is closed such that the web browser launch setting has a persistent state;

closing the application for producing a closed browser, said web browser launch setting persisting, and being the same, after closing as before such that the web browser launch setting is in a persistent state;

when the user launches the web browser, the web browser sends the request for the user-specific URL;

said distributor's web server, under the control of said CPU, returning said home page to said user in accordance with said user-specific URL address when said browser is launched again;

the distributor's web server receives the user-specific URL request and retrieves the account ID contained in the user-specific URL request;

the user identification module of the distributor's web server uses the account ID to retrieve demographic data for the user whose request includes the account ID;

the distributor's web server, sends the user demographic to the advertising message retriever of the distributor web server which accesses the advertising message database and retrieves the advertising message customized to the user profile;

the web server distributing the home page containing either the advertising message, or if no advertising message is available then a default web page, to the user's web browser;

the distributor crediting said value account of the user upon said web server returning said home page displaying the advertising message to said browser of the user station at the user-specific URL when the persistent state homepage is launched by the user station;

the user purchasing goods associated at a retailer;

the retailer, responsive to the purchase, provides user account ID to the distributor;

the distributor, responsive to receiving the account ID, credits user's value account for an amount equivalent to the promotional offer, discount, premium, gift, patronage reward, product sample, or purchase incentive contained in the advertising message.

2. A method as claimed in claim 1, wherein said value account is a payment account and wherein said crediting of said value account comprises crediting a payment amount to said value account.

3. A method as claimed in claim 1, wherein said advertising message is displayed in another browser window of said web browser when said homepage of the web browser is launched.

4. A method as claimed in claim 1, wherein said one of said advertising messages displays the discount.

5. A method as claimed in claim 1, wherein said advertising message includes a link to a website for one or more advertised goods, said value account being credited if said user accesses the advertising message.

6. A method as claimed in claim 1, wherein said at least one of said advertising messages tells user to go to a retail location to redeem the discount advertised in the advertising message.

* * * * *